United States Patent [19]

Glod et al.

[11] Patent Number: 5,630,779
[45] Date of Patent: *May 20, 1997

[54] EASY-OPEN BAG PACK, METHOD OF FORMING AND SYSTEM

[75] Inventors: Lawrence J. Glod, Macedon; Richard E. Leone, Newark, both of N.Y.

[73] Assignee: Tenneco Packaging, Evanston, Ill.

[*] Notice: The term of this patent shall not extend beyond the expiration date of Pat. No. 5,507,713.

[21] Appl. No.: 478,124

[22] Filed: Jun. 7, 1995

Related U.S. Application Data

[63] Continuation-in-part of Ser. No. 119,346, Sep. 9, 1993, Pat. No. 5,507,713.

[51] Int. Cl.⁶ .......................... B31B 23/86; B31B 27/60
[52] U.S. Cl. .................. 493/194; 493/195; 493/204; 493/926
[58] Field of Search ........................... 493/193–197, 493/210, 204, 212, 267, 926

[56] References Cited

U.S. PATENT DOCUMENTS

| | | | |
|---|---|---|---|
| 4,560,067 | 12/1985 | Reimann | 206/554 |
| 4,744,200 | 5/1988 | Benoit, Jr. et al. | 53/447 |
| 4,785,938 | 11/1988 | Benoit, Jr. et al. | 206/554 |
| 4,811,417 | 3/1989 | Prince et al. | 383/9 |
| 4,854,999 | 8/1989 | Schirmer | 156/272 |
| 4,877,473 | 10/1989 | Snowdon et al. | 156/204 |
| 4,989,732 | 2/1991 | Smith | 206/554 |
| 5,020,750 | 6/1991 | Vrooman et al. | 248/97 |
| 5,087,234 | 2/1992 | Prader et al. | 493/194 |
| 5,183,158 | 2/1993 | Boyd et al. | 206/554 |

Primary Examiner—Joseph J. Hail, III
Assistant Examiner—Christopher W. Day
Attorney, Agent, or Firm—Arnold, White & Durkee

[57] ABSTRACT

A system for suspending a pack of thermoplastic bags, loading bags, removing loaded bags and for automatically opening the next bag preparatory to loading it by having a pack of handled bags suspended from laterally spaced elongated rods of a rack. A novel gradually releasably adherent bond is created between the rear wall of a leading bag and the front wall of a following bag in the bag pack. As the leading bag is removed from a bag rack, the bond will gradually and fully open the mouth and body of the following bag for loading.

13 Claims, 5 Drawing Sheets

EASY-OPEN BAG PACK, METHOD OF FORMING AND SYSTEM

RELATED APPLICATIONS

This application is a continuation-in-part application of application Ser. No. 08/119,346, now U.S. Pat. No. 5,507,713, filed Sep. 9, 1993, the contents of which are expressly incorporated herein by reference.

FIELD OF THE INVENTION

The present invention is concerned with a pack of bags of the thermoplastic film type wherein each bag is in the layflat condition. It is also concerned with a method of forming bags and bag packs and a system utilizing the bag packs. More particularly, the present invention relates to a pack of bags wherein each bag is treated, structured and used so that the foremost bag is always in an opened or partially opened condition and, therefore, ready for filing without substantial time lost accessing the bag mouth of each bag.

BACKGROUND OF THE INVENTION

Since the commercial introduction of the plastic film grocery bag in this country, its acceptance has steadily grown because of its many advantages over kraft paper grocery bags. The many advantages connected with present-day plastic grocery bags include their ability to be unaffected by water, the fact that they are not as bulky as paper grocery bags, are less expensive and stronger than paper bags, as well as the fact that most have carrying handles, making them easier to use.

However, because of the inherent lack of rigidity of the plastic film employed in the manufacturing of these bags, special means are required for suspending packs of plastic bags and for holding the foremost bag in a pack in a position conducive to filling the bag. As may be readily appreciated, long lines at the checkout counter of a supermarket are annoying to the customers and baggers. If a bagger utilizing plastic bags has to fumble to open each bag, productivity suffers.

In certain bag dispensing systems wherein the bag pack is used in conjunction with a suspension and dispensing means, the use of plastic bags will outperform paper grocery bags from an ease-of-handling and time standpoint. There is, however, always room for improvement, and any innovation which will cut down handling time and/or in any way facilitate the use of such bags amounts to a significant advance in the art.

Disclosures which relate to improvements in plastic grocery bags and dispensing systems include U.S. Pat. No. 4,165,832 to Kuklies et al., which describes packs of thermoplastic grocery sacks wherein the individual bags are designed to be held in registration by being thermally welded together at a suspension tab member which extends from the center region of the bag mouth. While this type of unitization is effective in maintaining the sacks in secure uniform registration at the bag mouth region, they do not keep the handles in registration. Such a bag pack is structured to be suspended from the center of the pack and it is awkward during dispensing and bag filling to deal with the loose unsecured handles particularly in bag packs containing over 100 bags in the pack.

U.S. Pat. No. 4,676,378, issued to Baxley et al., discloses a technique for suspending a pack of bags from the handles of the bags in the bag pack. The suspension points are located intermediate the top and the bottom of the handles. This is accomplished by threading each stack of handles onto anchored spaced parallel suspension rods through a suspension orifice in each handle. This means or manner of suspension permits individual bags to be opened with one swipe of the hand, leaving the bag in its opened condition, i.e., front panel separated from the back panel, with the handle loops spread open and suspended from the suspension rods. This broad means will be the suspension means involved in the instant invention.

The Baxley et al. patent also discloses a technique for automatically opening the next bag in a suspended bag pack as a loaded bag is removed from the system. This is essentially the same technique as is disclosed in U.S. Pat. No. 4,106,734, issued to Walitalo, which teaches suspending handle-less bags from suspension rods and utilizing an adhesive area just below the bag mouth on the front of each bag in the pack. This arrangement causes the next adjacent bag in the pack to be in separable adhesive contact with the bag that precedes it. Thus, after a bag is loaded and during removal of the loaded bag from the rack, the front panel of the following bag will tend to follow along a short distance before release. This action causes each following bag to more or less automatically open as a filled bag is removed.

U.S. Pat. No. 4,796,759, issued to Schisler, is directed to a pack of thermoplastic film handled grocery sacks. A hole is present in each handle so as to receive a rod therethrough designed to support the bag pack by the handles. A center support tab extends from the mouth of each bag and the tabs are joined together by welding or gluing to secure the bags in a pack. A line of perforations separate the support tab from the bag mouth. Below the perforation line of each bag is a "glued or welded localized zones 9" which ensures connection between the rear wall of one bag and the front wall of the next bag and so on through the bag pack. Above this point 9, the welded-together support tabs maintain the bags in registration and the localized glued or welded zones 9 assists in opening the bags during the dispensing and loading of the same. This construction also has the disadvantage that no provision is made for maintaining the handles in registration.

While these techniques of enhancing the system of suspending, dispensing and filling grocery sacks have merit, those involving adhesives have the disadvantage of leaving each bag with a more or less localized tacky region on the outside surface of each bag. As may be appreciated, the use of adhesives introduce an additional messy step into the manufacturing process.

U.S. Pat. No. 5,335,788 to Beasley discloses self-opening polyethylene film bag stacks which do not utilize a separate adhesive layer between bags in the stack. At least an upper portion of the outer surface of the front and rear walls of each of the bags in the bag stack are corona treated. At least one compressed area extends transversely through the bag stack in the upper portion of the bags such that the stack has a decreased thickness in the localized area and so that adjacent outer wall corona treated surfaces defined by the localized compressed area are releasably adhered together.

Other advances include U.S. Pat. No. 4,811,417, issued to Prince et al., which shows a bag pack having vertical slit support handles therein, wherein the handles are melt-bonded together at the top by means of a heated pin device.

In U.S. Pat. No. 4,989,732, which is incorporated herein by reference in its entirety for all that it discloses, there is described a system for suspending and dispensing grocery sacks. The bag packs are suspended through orifices in the handles by a pair of spaced parallel cantilevered rods.

Dispensing of the bags in a manner which will cause the next following bag to be partially opened upon removal of a lead bag is facilitated by the provision of pressure bonded areas in the handles and in the region of the bag mouth. As a lead bag is removed the next adjacent bag tends to follow along for a short distance during which the front panel of the bag separates from its rear panel. When the lead bag finally releases from the following bag, the next bag is in a partially opened condition so that the supermarket bagger can easily access the interior of the bag.

Application Ser. No. 07/529,806, filed on May 29, 1990, which is a continuation-in-part of application Ser. No. 07/495,070, filed on Mar. 19, 1990, the contents of which are incorporated herein by reference, discloses a thermoplastic film bag pack comprising a plurality of the bags stacked in at least general registration in a layflat condition, each of the bags comprising a bottom, side walls and an open mouth top portion, the open mouth portion comprising handles located at opposite end regions thereof, at least a portion of the external surface of the film of the open mouth and handles region having been subjected to a corona discharge treatment to such an extent that the pressure and cutting action forming the bag mouth and handles will cause adjacently facing corona discharge treated cut-edge regions to releasably adhere together until a moderate force separates them.

Despite these advances in the art, it would be a significant advance if further handling time reductions or improvements which, in any way, facilitate the use of such bags could be accomplished.

SUMMARY OF THE INVENTION

In accordance with the present invention, there is provided a thermoplastic film bag pack comprising a plurality of bags stacked in at least general registration in a layflat condition, each of the bags comprising a bottom wall, a front wall, a rear wall, gusseted side walls and an open mouth top portion, the mouth portion having double film loop handles at opposite ends thereof, the handles being integral extensions of the front, rear and side walls, each of the walls having an interior and exterior surface, wherein at least a portion of each the external surfaces of the front and rear walls are subjected to a corona discharge treatment to an extent effective to cause adjacently facing corona discharge treated surface portions of adjacent bags within the bag pack to releasably fuse to each other upon a localized application of force, the force applied by contacting the bag pack with at least a first pair of anvil means, the pair of anvil means including a lower anvil means positioned to contact the bottom bag of the bag pack within the corona discharge treated surface portion of the bottom bag and an upper anvil means substantially aligned with the lower anvil means and positioned to contact the top bag of the bag pack within the corona discharge treated surface portion of the top bag, the pair of anvil means having a force applied thereto effective to cooperatively form at least one releasable fused region within the corona discharge treated surface portions of each bag of the bag pack.

The present invention is also concerned with a method of forming a pack of gusseted, polyethylene film, integrally-extended handle bags comprising: (a) providing a collapsed tube of polyethylene film; (b) corona discharge treating at least a portion of the external surfaces of the tube; (c) forming side gussets in the tube; (d) transverse-sealing the tube at bag-length distances apart to form a series of end-sealed gusseted pillowcases; (e) separating and stacking a plurality of the pillowcases in at least general registration; and (f) severing all the film layers along a line so as to form integrally extended double film loop handles and an open mouth region in each bag and simultaneously or sequentially forming handle support orifices in each handle; and (g) applying localized pressure to at least one end of the stack by contacting the stack with at least a first pair of anvil means, the pair of anvil means including a lower anvil means positioned to contact the bottom bag of the stack within the corona discharge treated surface portion of the bottom bag and an upper anvil means substantially aligned with the lower anvil means and positioned to contact the top bag of the stack within the corona discharge treated surface portion of the top bag, wherein the pressure applied thereto is effective to cooperatively form at least one releasable fused region within the corona discharge treated surface portions of each bag of the stack.

This invention further concerns a method for forming a gradually releasably adherent bond between bags in a bag pack, each bag in the bag pack having a mouth and two handles, comprising: a) providing a bag pack comprised of individual bags having exterior surfaces, the exterior surfaces having at least one corona discharge treated region; b) positioning the bag pack between at least a first pair of anvil means, the anvil means comprising an upper anvil means and a lower anvil means; wherein the upper anvil means comprises a concave-surfaced anvil having a cross section substantially encompassing the lower anvil means and the lower anvil means comprises at least two tangentially aligned convex-surfaced anvils; c) compressing the bag pack between the at least one pair of anvil means in the at least one corona discharge treated region to form at least one gradually releasable fused region connecting a rear wall of a leading bag to the front wall of a following bag in the bag pack; wherein the gradually releasable fused region comprises fused zones and a non-fused zone; wherein the fused zones have substantially the same strength as a non-compressed region of the bag pack.

It is particularly preferred to create this gradually releasable adherent bond between bags using four fused releasable regions arranged in two pairs. An upper pair is positioned just below the bag mouth with one fused releasable region directly below each bag handle. A second lower pair is positioned directly below the first pair at a distance of about 5.08 cm (2 in). It has been found that this arrangement of four fused releasable regions results in the full opening of the entire body of the bag. This ability is a significant improvement over the prior art which is effective to open only the area near the bag mouth.

The invention also relates to a system for suspending a pack of bags, for loading bags, for removing loaded bags and for automatically opening the next bag preparatory to loading comprising; a pack of bags suspended on a rack, the rack comprising a pair of laterally-spaced, elongated support rods having leading ends; the bag pack comprising a plurality of bags stacked in at least general registration in a layflat condition, each of the bags comprising a bottom wall, a front wall, a rear wall, gusseted side walls and an open mouth top portion, the mouth portion having double film loop handles at opposite ends thereof, the handles being integral extensions of the front, rear and side walls, each of the walls having an interior and exterior surface, wherein at least a portion of each the external surfaces of the front and rear walls are subjected to a corona discharge treatment to an extent effective to cause adjacently facing corona discharge treated surface portions of adjacent bags within the bag pack to releasably fuse to each other upon a localized application of force, the force applied by contacting the bag pack with at least a first pair of anvil means, the pair of anvil means including a lower anvil means positioned to contact the bottom bag of the bag pack within the corona discharge treated surface portion of the bottom bag and an upper anvil means substantially aligned with the lower anvil means and positioned to contact the top bag of the bag pack within the corona discharge treated surface portion of the top bag, the pair of anvil means having a force applied thereto effective to cooperatively form at least one releasable fused region within the corona discharge treated surface portions of each bag of the bag pack the fused region releasably adhering until a moderate force causes separation; aligned mounting orifices in association with the handles located between the top and base of the handles; the pack mounted on the support rods through the orifices so that during removal of a bag from the bag pack at least a portion of the mouth and handle region of the front wall of the next bag will follow the bag being removed for a short distance before separation thereby opening the next bag rendering it ready for loading.

Therefore, it is an object of the present invention to provide a pack of thermoplastic film grocery sacks having integrally extended handles with support means in association with the handles.

It is another object of the present invention to provide a system for suspending a pack of bags, for loading bags, for removing loaded bags and for automatically opening the next bag preparatory to loading.

It is a further object of the present invention to provide a method of forming a pack of gusseted, polyethylene film, integrally-extended handle bags.

Still another object of the present invention is to provide a bag pack having releasable fused zones which are created without substantial weakening or deformation of the material making up the walls of the individual bags in the bag pack.

Another object of the present invention is to provide a large, gradually releasably adherent connection between a leading bag and a following bag in a bag pack.

Still a further object of the present invention is to provide a plurality of gradually releasable adherent connections between bags in a bag pack so as to fully open a following bag as a leading bag is removed from the bag pack.

Yet another object of the present invention is to provide a releasable fused region between bags in a bag pack wherein the region contains fused and non-fused zones.

Other objects and the several advantages of the present invention will become apparent to those skilled in the art upon a reading of the specification and the claims appended thereto.

DETAILED DESCRIPTION OF THE INVENTION

Figure 1:
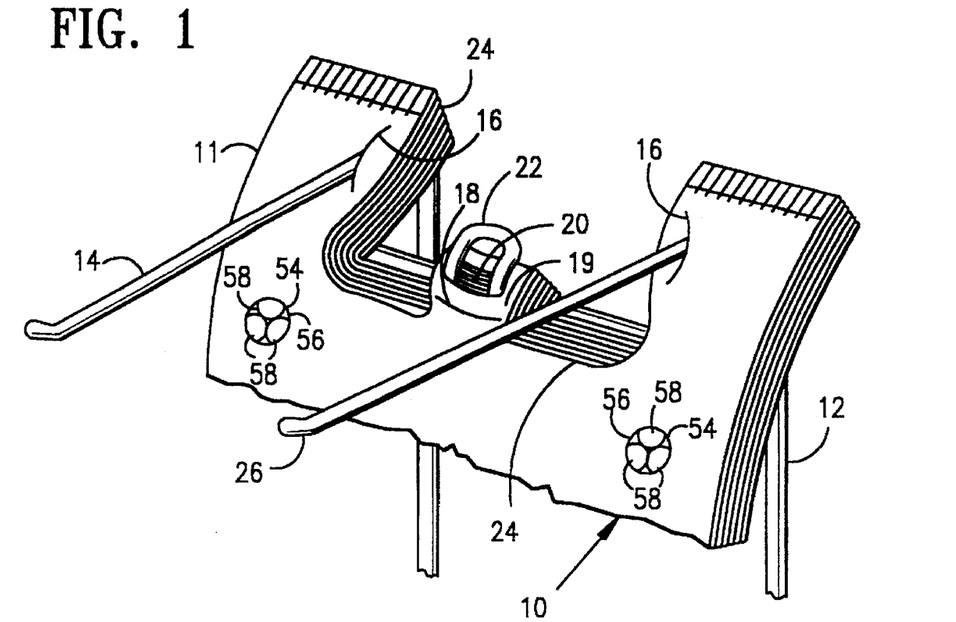
FIG. 1 is a partial perspective view of a bag pack and rack according to the invention.
Figure 2:
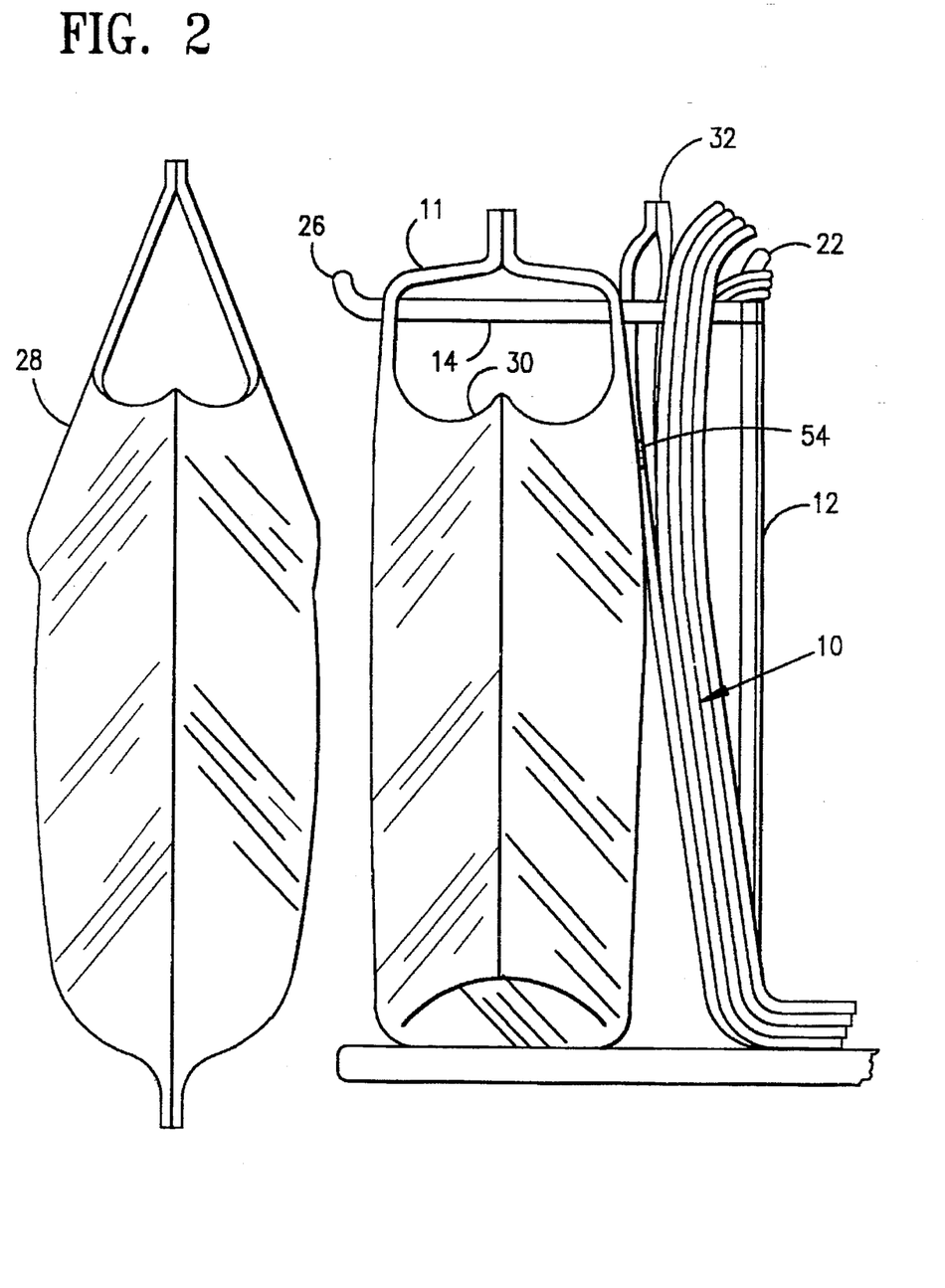
FIG. 2 is a side elevational view of a rack mounted bag pack with several bags shown forwardly drawn therefrom.

In FIG. 1 there is shown a partial segment of a bag pack 10. The lower part of the bag pack is as shown in FIG. 2 and its details are conventional in structure and, thus, form no part of the invention disclosed herein. Pack 10 is shown suspended from rack 12. To accomplish this, the handles 11 are threaded onto parallel arms 14 by way of optionally curved orifices 16.

The individual bags of the bag pack shown have double-film loop handles by virtue of the fact that the bags were made from gusseted pillowcases as is well known in the art. FIG. 2 shows handles 11 of bag 30 almost fully extended on support arms 14. FIG. 1 shows cut line 24, which defines the inboard configuration of the handles, the bag mouth region and a center tab region used for center support of the bag pack. The center tab region includes an orifice 20 utilized for receipt of a suspension member, such as a tongue 22. A separate tab is in association with the front and rear panels of each bag at the mouth region. The front tab has, near the base thereof, a severance line 18 which may be a continuous severance or there may be a small tie connection 19 at each end. In either case, the strength of the material holding the front portion of the bag to the hanger tab area must be small enough to allow the "fusion" of the film layers to cause the attached areas to break on the trailing bag. This severance line permits a supermarket bagger to gain easy access to the front panel of the first bag in a pack preparatory to loading the bag. The rear tab is connected by a perforation line to the back panel of each bag.

The essence of the invention is the provision of a system which permits the automatic opening of a following bag during the removal of a loaded bag. This is accomplished by causing at least some part of the upper regions of the outside surfaces of each bag to lightly adhere to one another in chain-like fashion. The aggressiveness of the adhesion should only be enough to break any front tab connection to the front wall of the following bag and cause the upper portion of the front wall to follow the upper portion of the back wall of the bag being removed, for a short distance, such as that shown in FIG. 2.

Figure 3:
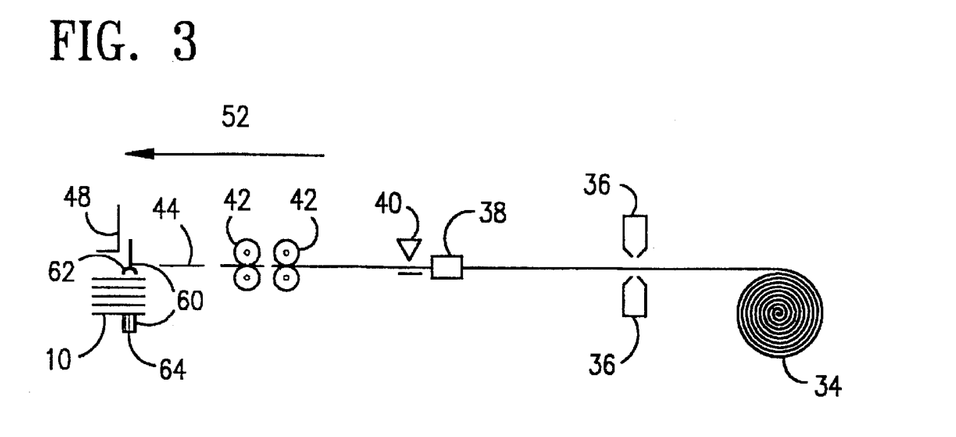
FIG. 3 is a side view of a schematic representation of the method of forming bag packs of the invention.

Referring now to FIG. 3, this phenomenon is accomplished by pretreating the external surfaces of the flattened tubular bag stock polyethylene film material with corona discharge 36 and coupling this with pressure applied by contacting the bag pack 10 with at least a first pair of anvil means 60, the pair of anvil means including a lower anvil means 64 positioned to contact the bottom bag of the bag pack 10 within the corona discharge treated surface portion of the bottom bag and an upper anvil means 62 substantially aligned with lower anvil means 64 and positioned to contact the top bag of the bag pack 10 within the corona discharge treated surface portion of the top bag. As may be appreciated, the pair of anvil means 60 are brought together to contact the bag pack 10 and a force is applied thereto which is effective to cooperatively form a releasable fused region 54 (see FIG. 1) within the corona discharge treated surface portions of each bag of bag pack 10. When the corona discharge treatment region at least involves the upper region of what will become the top front and back of the bag, plus the aforementioned application of force, the automatic bag opening will result during use of the packs according to the present system.

The strength of the adhesion of the releasably fused regions is comparatively small. Yet, small as it is, it is strong enough to break any properly designed tab ties 19 located at the ends of severance line 18. For example, with about 0.45–0.75 mil films,, tab ties of up to 4.76 mm (3/16 in) are easily broken. Thus, the force necessary to break the adhesion is also comparatively small. This force is supplied by the drag caused by the full weight of the entire following bag, by the drag of the handle film material against the support rod material and/or by the resistance caused by the turned-up ends 26 of the support rods 14. As shown in FIG. 2, bag 28 has separated from bag 30 by reason of one or all of these causes and bag 32 remains adhered to bag 30 but is in the early stage of opening.

FIG. 3 illustrates schematically the formation of the treated bag packs. A convoluted roll 34 of a flattened tubular film is the precursor for the individual bags. This film material can be any thermoplastic material which can be treated with corona discharge and be utilizable in the system of the present invention. A suitable class of materials are the polyethylenes generically, including homopolymer polyethylene of high, intermediate or low density, linear low density copolymers of ethylene and another $C_3$–$C_{10}$ alpha-olefin (LLDPE), and any blends of the foregoing. The thickness of the film is that normally used for grocery bags and may range from about 0.3 to about 1.5 mils greater. A preferred thickness is from about 0.45 to about 0.75 mils. Any size bag is contemplated but the 1/6 barrel size bag and smaller is preferred.

The film material is passed in the direction of arrow 52 between two oppositely disposed corona discharge treaters 36 positioned so as to treat the outside surfaces of the collapsed tube. The treatment can be intermittent so as to treat a designated region or regions of the film or it may be a continuous treatment affecting all of the outside of the bag or that of a narrower stripe restricted to, e.g., the upper-center region of the bag. Corona discharge treatment equipment is readily available commercially. Appropriate equipment can be obtained from Solo Systems Inc., Garland, Tex.; Corotec Corp., Collinsville, Conn.; and others. The film should be treated to a surface tension level of at least about 38 dynes/cm, in accordance with ASTM Standard D2578-84. A range of between about 40 to about 50 is preferred. Using Solo Systems equipment, each treater can have an air gap of 0.060 inch when treating LLDPE film of about 0.65 mils. The treatment area can include a center region of the film about 11 inches wide, treated to 40–44 dynes/cm, as is particularly preferred.

After this degree of treatment, the tube is passed through a gusseter 38 which includes a gusset of from about 3 to about 5 inches into the collapsed tube. The tube proceeds to a transverse heat seal means 40 of conventional design which imposes heat seals 50 at bag length distances apart. Such a heat seal means is usually a resistance strip or bar, positioned to put a transverse seal across the gusseted tube at bag length distances apart. The sealed tube then proceeds to a combination of differential speed rollers which separates the tube into end-sealed gusseted pillowcases 44. The pillowcases are then stacked to the appropriate number desired, e.g., 50, 75, 100, 125, etc., and, either in line or at a remote location, a cutting device 48 applies pressure and cuts one end of the stack so as to remove plastic, leaving the shape of handles, a bag mouth and center suspension tabs in the bag pack. This cutting device 48 may also include means for including a suspension orifice in the handles of the bags. The orifice can be of a variety of shapes, e.g., a circle, part of a circle with a flap remaining therein, a curve of less than one-quarter of a circle, a straight slit, a teardrop cutout, a zig-zag orifice, etc. As shown in FIG. 1, handle suspension orifice 16 is a curved slit facing inward of the handles so that any tendency to tear will propagate toward the inner edge of the handles rather than to the center thereof where it would weaken the handles.

Also, either in line or at a remote location, to releasably fuse the treated surfaces of adjacent bags to each other, a localized force is applied. As indicated above, the force is applied by contacting bag pack 10 with at least a first pair of anvil means 60, the pair of anvil means 60 including a lower pack 10 within the corona discharge treated surface portion of the bottom bag and an upper anvil means 62 substantially aligned with the lower anvil means 64 and positioned to contact the top bag of the bag pack within the corona discharge treated surface portion of the top bag. Following bringing the anvil means in close contact with each other, the bag pack 10 being in between the upper and lower anvil means 62 and 64, the pair of anvil means 60 then have a force applied which is effective to cooperatively form at least one releasable fused region 54 within the corona discharge treated surface portions of each bag of the bag pack 10. It has been found that for a stack of 100 bags composed of low density polyethylene a force of about 9,764–12,205 kg/m² (2000–2500 lb/ft²) is required to create the releasable fused region. This amount of force is much less than that disclosed in the prior art.

Figure 6:
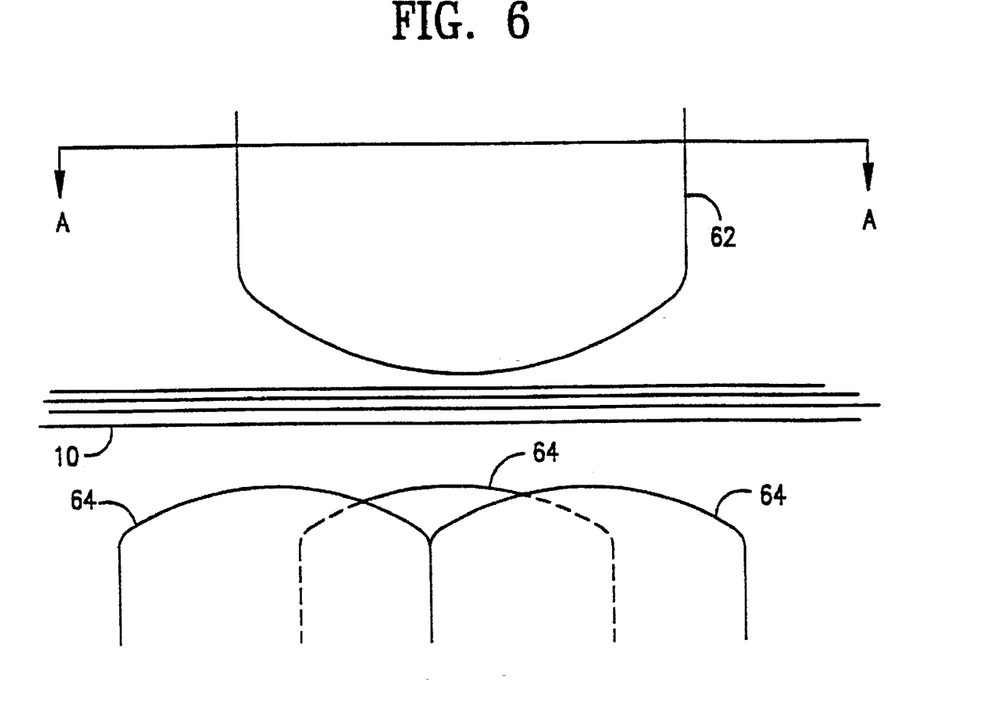
FIG. 6 is a side view of a bag pack about to be contacted by a lower anvil means and an upper anvil means.
Figure 7:
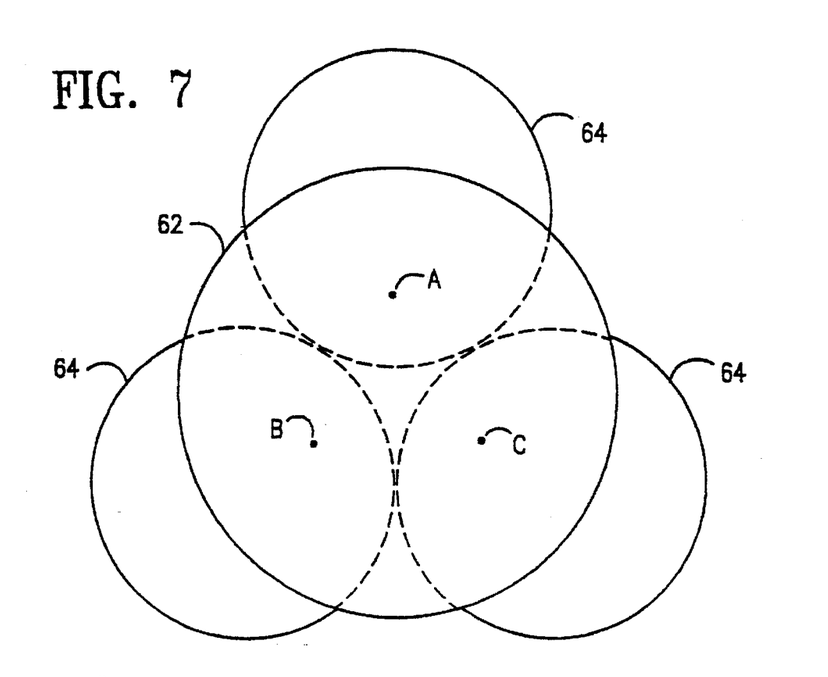
FIG. 7 is a sectional view of the overlapping relationship between the upper anvil means and the lower anvil means.

Turning now to FIG. 6, a side view of the novel upper and lower anvil means 62, 64 is shown just before they contact the bag pack 10. The lower anvil means is positioned below the bag pack 10 and comprises a plurality of tangentially aligned anvils. As shown and particularly preferred, the lower anvil means 64 includes at least three convex-surfaced anvils triangularly aligned. The upper anvil means 62 is positioned above the bag pack. It includes a concave-surfaced anvil having a cross-sectional diameter which substantially encompasses the lower anvil means 64. FIG. 7 is a sectional view showing the relationship between the upper anvil means 62 and the lower anvil means 64. If the upper anvil means 62 were lowered to physically contact the lower anvil means 64 such contact would take place at three points A, B, and C. Of course during the formation of the bag pack 10, the upper and lower anvil means never physically contact each other.

The practice of the present invention includes varying the size of the upper and lower anvil means as needed given the bag material and bag selected. For the arrangement shown in FIG. 7, the diameter of the upper anvil means may be about 145% that of each anvil of the anvils making up the lower anvil means. An upper anvil means of diameter 20.3 mm (0.800 in) used with three lower anvils of diameter 14 mm (0.550 in) has been found to be very effective in the practice of this invention. Use of such large diameter anvils to form a releasable fused region 54 is unprecedented in the prior art and provides many advantages as described herein below. It should be well understood that the anvil sizes stated herein are intended as non-limiting examples. It is well within the capability of a person of ordinary skill in the art to vary the configuration, number, and placement of upper and lower anvil means to achieve the proper releasable fused region 54 for a particular application.

Figure 5:
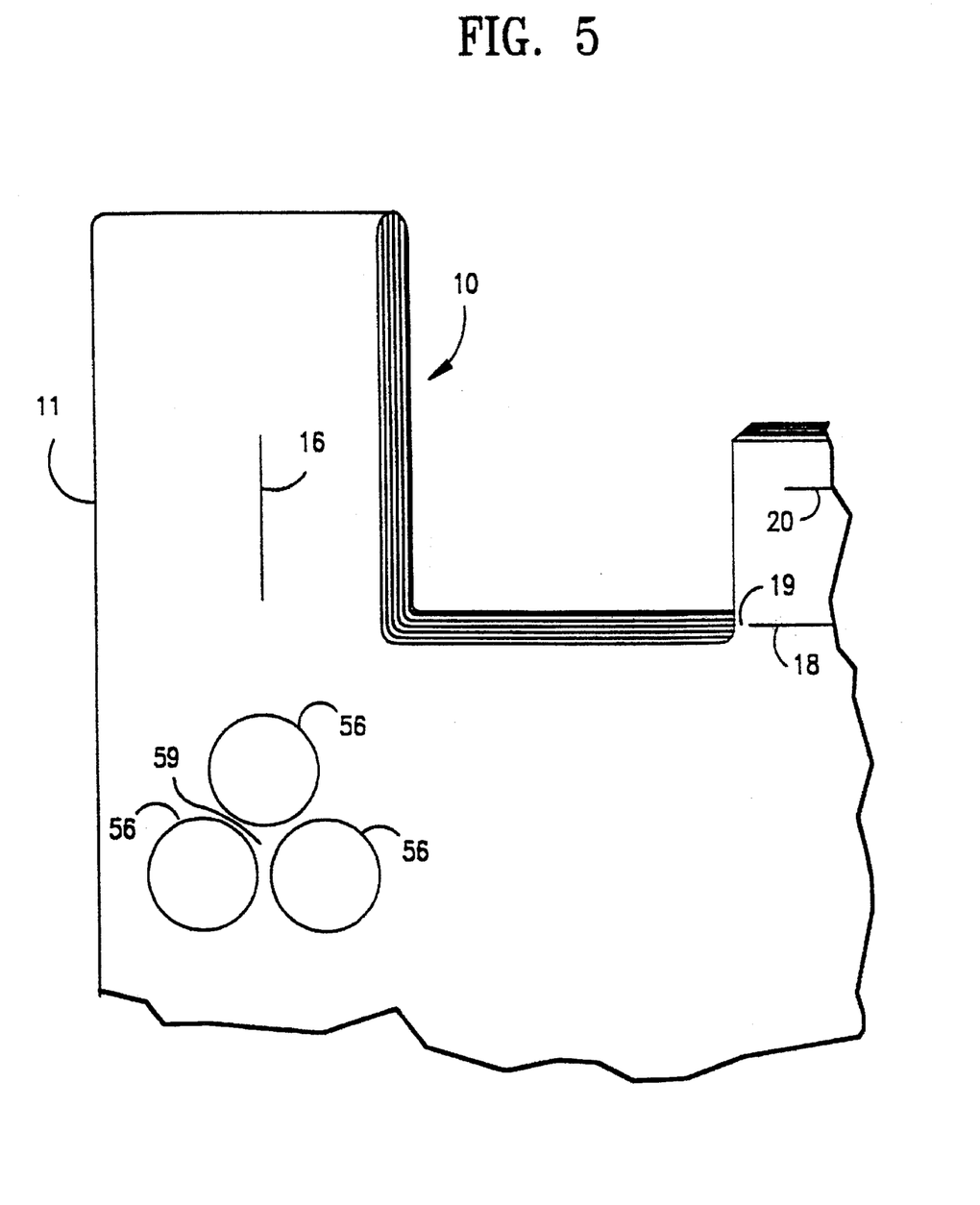
FIG. 5 is a partial top view of a bag pack having three closely spaced dimples.

The scope of the present invention includes creating a gradually releasably adherent bond between bags in a bag pack by creating a suitable number of releasable fused regions 54 in as many locations as necessary to ensure the complete and efficient opening of a following bag in a bag pack by a leading bag thereof. In a particularly preferred bag pack 10, as is shown generally in FIG. 1 and in more detail in FIG. 5, the use of a first and second pair of anvil means 60 is required to form first and second releasable fused regions 54 within the corona discharge treated surface portions of the bag. The releasable fused regions are preferably located below the mouth 24 and handle 11 region of the bags.

The dimples 56 within the releasable fused regions 54 have the same general configuration as the lower anvil means, i.e. three circles in tangential alignment. (See FIG. 5) However, the dimples are significantly different in that they are separated by a non-fused zone 59. It can be seen that despite the tangential contact between the anvils in the lower anvil means, the dimples formed thereby do not tangentially contact each other. Rather the dimples are closely spaced. (The dimples shown in FIG. 5 have been shown enlarged relative to the rest of the bag for clarity.) The releasable fused regions 54 therefore comprise fused zones and a non-fused zone. The fused zones are comprised by the dimples 56. The non-fused zone 59 can be defined as any non-fused area bounded on either side by a fused zone.

The combination of large dimple size and the presence of non-fused zones in the releasable fused region 54 provide exceptional performance in an easy open grocery bag pack. It has been observed that the separation of the back wall of a leading bag from the front wall of a following bag occurs gradually in a controlled fashion in the bag pack of the present invention. It has been observed that the fused portions of the bag walls gradually peel apart as the lead bag pulls open the following bag in a bag pack. This phenomenon can also be referred to as gradual linear separation because the bag walls separate along a horizontal line that travels from the top to the bottom of the releasable fused region 56. In contrast, prior art releasable connections such as that described in U.S. Pat. No. 5,335,788 to Beasley separate all at once and tend to pop apart. In the practice of the Beasley patent, the entire bonded area of the releasable connection separates suddenly potentially detracting from bag opening performance. Moreover, the system disclosed in the Beasley patent is effective to open only the mouth area of the bag. The lower two-thirds of the bag body below the bag mouth is not opened. A grocery store attendant would still be faced with the additional, time-consuming task of manually opening the body of the bag by hand.

The presence of the non-fused zone in the releasable fused region 54 of the present invention reduces the stresses created as the bags in a bag pack are separated. Moreover, the dimples 56 of the present invention provide a large area upon which to distribute the force necessary to form the releasably adherent connection. As a result, significantly less force is required to form the dimples and there is no significant deformation of the bag material. It follows that the bag pack releasable fused region 54 can be formed with much less compression of the bag pack than is required by prior art methods. The imprint formed on the bag does not result in any weakening of the bag wall. The bag wall thickness in the dimple is substantially the same as the bag wall thickness outside of the dimple. This characteristic is particularly important to the successful use of multiple releasable fused regions 54 and affords a bag manufacturer more flexibility in placement of the releasable fused regions 54. Prior art techniques requiring a force of 5000 lbs or more to compress the stack face limitations in the numbers and placement of releasably adherent areas.

The large surface area devoted the formation of the releasable fused region 54 may also serve to compensate for any deficiencies in the operation of the associated manufacturing equipment. Prior art methods or bags using a releasably adherent area composed of a single bonding point or even a collection of widely space bonding points may suffer serious performance problems if such deficiencies are encountered. Increasing the number of prior art bonding points is not a desirable solution due to the above described tendency of prior art methods to weaken bag film material at the bonding points. In its preferred embodiment using three dimples, the present invention will function properly to provide a gradually releasable fused region even if a proper bond is not created in one of the dimples. It has been found that two of the three dimples will provide satisfactory opening performance.

Figure 8:
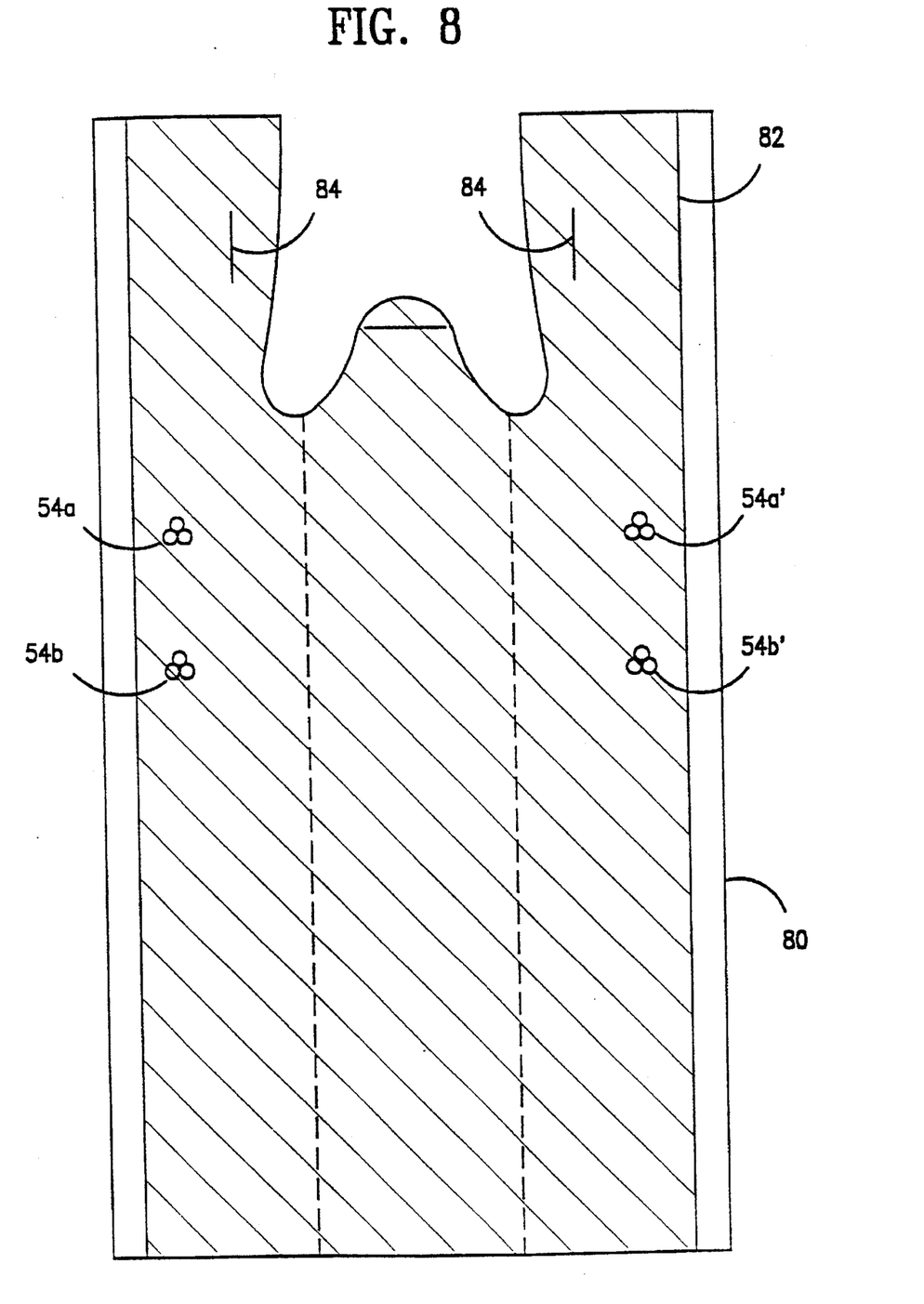
FIG. 8 is an elevation view of an embodiment of the present invention utilizing four releasable fused regions.

A preferred embodiment of the practice of the present invention is shown in the elevation view of a complete bag 80 in FIG. 8 where a four releasable fused regions 54 have been used. This preferred embodiment is about 30.5 cm (12 in) wide and has an overall height of about 56 cm (22 in). The corona discharge treated region 82 is shown as the shaded area in FIG. 8. The region 82 is about 28 cm (11 in) wide and is centered from side to side on the bag. There is provided an upper pair of releasable fused regions 54a, 54a' and a corresponding lower pair, 54b, 54b'. The upper pair 54a, 54a' is positioned below the bag mouth with one region directly below each handle. The lower pair, 54b, 54b' is placed directly below the upper pair at a distance of about 5.08 cm (2 in). It has been found that this novel arrangement of gradually releasably bonded regions will open fully the entire body of the bag.

It will be noted that the suspension orifices 84 are located at a midway position in the handles. This is important for the most efficient operation of the system of the present invention. Located midway permits the loop of the handles to spread open on suspension rods 14 as shown in FIG. 2. Spreading the handle loops in this manner opens the bag. If the bags were suspended from the handles from a point above the top seals of the handles, as taught by some prior art, the handle loops would not be able to spread open because the support rods would be remote from the loops. As indicated above, seconds and fractions of a second are extremely important when translated into the front end overhead costs of a supermarket. Any improvement which saves these short intervals of overhead expense is a significant advance in the art. The overall time saved by the present invention is considerable.

Figure 4:
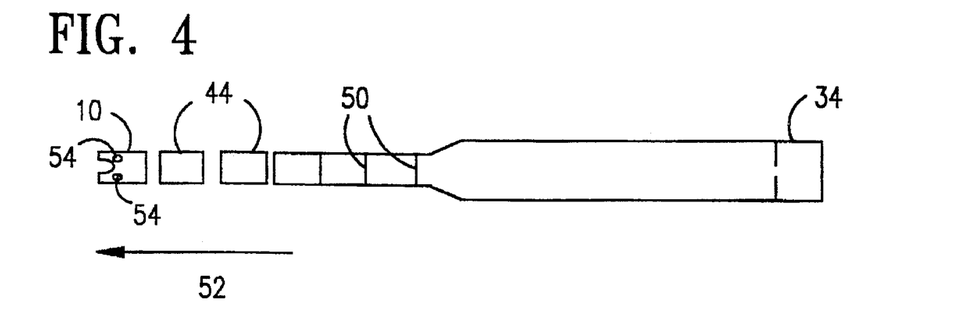
FIG. 4 is a plan view of the schematic of FIG. 3 absent the manipulative means.

FIG. 4 shows in plan view the operation and results of carrying out the process of FIG. 3 which culminates in the formation of bag pack 10. As may be seen, releasably fused regions 54 have been formed in the bags of bag pack 10.

It is not fully understood why the corona discharge treatment and pressure technique results in the efficient automatic opening of a following bag in the subject system. Attention is, however, directed to the paper MECHANISM OF CORONA-INDUCED SELF-ADHESION OF POLYETHYLENE FILM by D. K. Owens, Journal of Applied Polymer Science Vol. 19, pp. 265–271 (1975). In this paper it is postulated that the force of adhesion between corona-treated polyethylene films is a hydrogen bond between the hydrogens of enolized keto groups in one sheet of film and carbonyl groups in the other. The corona treatment across the front and back of each gusseted sack is believed to stimulate both the bonding and releasing effect created by the dimple design.

Although the present invention has been described with preferred embodiments, it is to be understood that variations and modifications may be resorted to, without departing from the spirit and scope of the invention, as those skilled in the art will understand. Such modifications and variations are considered to be within the purview and scope of the appended claims.

What is claimed is:

1. A method of forming a pack of gusseted, polyethylene film, integrally extended handle bags comprising:

(a) providing a collapsed tube of polyethylene film;

(b) corona discharge treating at least a portion of the external surfaces of said tube;

(c) forming side gussets in said tube;

(d) transverse-sealing said tube at bag-length distances apart to form a series of end-sealed gusseted pillowcases;

(e) separating and stacking a plurality of said pillowcases in at least general registration;

(f) severing all the film layers along a line so as to form integrally extended double film loop handles and an open mouth region in each bag and simultaneously or sequentially forming handle support orifices in each handle; and (g) applying localized force to at least one end of the stack by contacting the stack with at least a first pair of anvil means, the pair of anvil means including a lower anvil means positioned to contact the bottom bag of the stack within the corona discharge treated surface portion of the bottom bag and an upper anvil means substantially aligned with the lower anvil means and positioned to contact the top bag of the stack within the corona discharge treated surface portion of the top bag, wherein said lower anvil means comprises a plurality of substantially convex endface surfaces each defining substantially circular peripheries;

wherein said upper anvil means comprises a convex endface surfaced anvil defining a substantially circular periphery;

wherein the force applied thereto is effective to cooperatively form at least one region within the corona discharge treated surface portions of each bag of the stack, said periphery of said upper anvil means defining an outer boundary of said region, the region being comprised of closely spaced, non-intersecting fused zones and a non-fused zone, the fused zones having substantially a same strength as a region of the bag pack to which the localized force is not applied.

2. The method of claim 1, wherein said substantially circular peripheries of said plurality of substantially convex endface surfaces are closely spaced.

3. The method of clam 2, wherein said substantially circular periphery of said convex endface surfaced anvil substantially encompasses said lower anvil means.

4. The method of claim 2, wherein said plurality of substantially convex endface surfaces are triangularly aligned.

5. The method of claim 4, wherein said substantially circular periphery of said convex endface surfaced anvil substantially encompasses said lower anvil means.

6. The method of claim 5, wherein said force applied includes an ultrasonically applied force.

7. The method of claim 6, wherein said localized application of force is applied by contacting the bag pack with at least a first and second pair of anvil means effective to cooperatively form first and second regions within the corona discharge treated surface portions.

8. The method of claim 7, wherein said first and second regions are located below each handle of each bag.

9. The method of claim 8, wherein said step of corona discharge treating is conducted to achieve a surface tension of at least about 38 dynes/cm.

10. A method for forming a gradually releasably adherent bond between bags in a bag pack, each bag in the bag pack having a mouth and two handles, comprising:

a) providing a bag pack comprised of individual bags having exterior surfaces, the exterior surfaces having at least one corona discharge treated region;

b) positioning the bag pack between at least a first pair of anvil means, the anvil means comprising an upper anvil means and a lower anvil means; wherein the upper anvil means comprises a convex endface surfaced anvil having a substantially circular periphery substantially encompassing the lower anvil means and the lower anvil means comprises a plurality of convex endface surfaced anvils;

c) compressing the bag pack between the at least one pair of anvil means in the at least one corona discharge treated region to form at least one region connecting a rear wall of a leading bag to a front wall of a following bag in the bag pack;

wherein the region comprises fused zones and a non-fused zone the fused zones having substantially a same strength as a non-compressed region of the bag pack.

11. A method according to claim 10 wherein the lower anvil means comprises three convex endface surfaced anvils.

12. A method according to claim 11 further comprising compressing the bag pack with three additional pairs of said anvil means, wherein the pairs of anvil means are arranged in an upper pair located below the bag mouth directly below the handles and a lower pair, the lower pair located about 5.08 cm below the upper pair.

13. A method according to claim 12 wherein in said step a) said exterior surfaces are corona discharge treated to a level between 35 dynes/cm and 50 dynes/cm.

* * * * *